United States Patent
Lidorikis et al.

(10) Patent No.: US 7,058,242 B2
(45) Date of Patent: Jun. 6, 2006

(54) POLARIZATION-INDEPENDENT OPTICAL NETWORKS IN 3D PHOTONIC CRYSTALS

(75) Inventors: Elefterios Lidorikis, Athens (GR); Steven G. Johnson, Cambridge, MA (US); Michelle L. Povinelli, Somerville, MA (US); John D. Joannopoulos, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/849,593

(22) Filed: May 20, 2004

(65) Prior Publication Data
US 2005/0053321 A1    Mar. 10, 2005

Related U.S. Application Data

(60) Provisional application No. 60/482,198, filed on Jun. 24, 2003.

(51) Int. Cl.
*G02B 6/00* (2006.01)
(52) U.S. Cl. .......................... 385/11; 359/483
(58) Field of Classification Search ............ 385/11; 359/483
See application file for complete search history.

(56) References Cited

U.S. PATENT DOCUMENTS 6,597,851 B1 * 7/2003 Johnson et al. ............. 385/131

2004/0264903 A1 * 12/2004 Dridi et al. ................. 385/129

OTHER PUBLICATIONS

"Novel Polarization-Independent Optical Bends for Compact Photonic Integrated Optics," Rajarajan et al. *SBMO/IEEE MTT-S IMOC'99 Proceedings*, 1999.
"Low-Loss Bent Connections for Optical Switches," Heinbach et al. *Journal of Lightwave Technology*. May 1997. vol. 15. No. 5.
"Three-Dimensionally Periodic Dielectric Layered Structure with Omnidirectional Photonic Bans Gap" Johnson et al. *Applied Physics Letters*. Nov. 2000, vol. 77, No. 22.
"Emulation of Two-dimensional Photonic Crystal Defect Modes in a Photonic Crystal with a Three-dimensional Photonic band gap," *Physical Review B*. 2001, vol. 64.
"Photonic Bands: Simple-Cubic Lattice," Soezueer et al. *J. of the Optical Society of America*, vol. 10, n. 2, pp. 296-302 (Feb. 1993).
"Polarization-Independent Linear Waveguides in 3D Photonic Crystals," Lidorikis et al. *Physical Review Letters APS USA* vol. 91, n. 2 (Jul. 2003).

* cited by examiner

*Primary Examiner*—Jennifer Doan
(74) *Attorney, Agent, or Firm*—Gauthier & Connors LLP (57) ABSTRACT

A photonic crystal includes a plurality of photonic crystal slabs that is suited for confining TE polarizations and TM polarizations. The photonic crystal slabs include alternating slabs of dielectric rods and air holes. The alternating slabs create a lateral symmetry plane. The alternating slabs of dielectric rods and air holes further include planar line defects resulting in the formation of defect bands inside the bandgap of the photonic crystal.

10 Claims, 8 Drawing Sheets

POLARIZATION-INDEPENDENT OPTICAL NETWORKS IN 3D PHOTONIC CRYSTALS

PRIORITY INFORMATION

This application claims priority from provisional application Ser. No. 60/482,198 filed Jun. 24, 2003, which is incorporated herein by reference in its entirety.

This invention was made with government support under Grant No. DMR-0213282 awarded by NSF. The government has certain rights in the invention.

BACKGROUND OF THE INVENTION

The invention relates to the field of optical communication, and in particular to integrated optical networks without polarization sensitivities.

The amount of digital data processed around the globe grows rapidly every year. To perform almost any kind of operation on optical signals today (like wavelength conversion, pulse regeneration, bit-rate conversion, logic operation, etc.) the signals first need to be converted to the electronic domain. Unfortunately, there are fundamental physical reasons that prevent electronics from operating well at high frequencies. As a result, the price of electronic components grows rapidly when higher bit-rates are needed. Consequently, using all-optical signal processing becomes rapidly more and more appealing.

Lossless guiding of light at length-scales approaching the wavelength of the light itself is a necessary property for any future integrated optical circuit. Most of the research in the area of all-optical devices today is in high-index-contrast integrated optics. While high index-contrast dielectric waveguides can reduce radiation losses from features such as sharp bends, they cannot completely suppress them and are in general very sensitive to roughness. Furthermore, they are highly polarization sensitive. Given that the polarization-state of an input signal may not be known and/or may vary over time, their proper operation would require the use of active polarization pre-processing devices. Research towards creating polarization-insensitive bends has been successful only at bends with a large radius of curvature, which however, is not useful for optical integration. In general, any feature of the integrated optical network other than a straight segment of a waveguide, will introduce radiation losses and polarization sensitivity, compromising the performance. An ideal system would be the one that suppresses both these mechanisms.

Photonic crystals have been shown in certain cases to eliminate radiation loss and thus offer a promising platform for designing high-performance waveguide networks. A common drawback, however, to all photonic-crystal waveguide systems proposed to-date, is that they are highly polarization selective.

SUMMARY OF THE INVENTION

According to one aspect of the invention, there is provided a photonic crystal structure. The photonic crystal includes a plurality of photonic crystal slabs that confine TE polarizations and TM polarizations. The photonic crystal slabs include alternating slabs of dielectric rods and air holes. The alternating slabs create a lateral symmetry plane and further include planar line defects resulting in the formation of defect bands inside the bandgap of the photonic crystal.

According to another aspect of the invention, there is provided a method of forming a photonic crystal structure that minimizes polarization insensitivities. The method includes forming a plurality of slabs of dielectric rods. Pluralities of slabs of air holes are formed. The method also includes forming planar line defects resulting in the formation of defect bands inside the bandgap of the photonic crystal using the slabs of dielectric rods and air holes.

DETAILED DESCRIPTION OF THE INVENTION

The invention addresses the issue of polarization insensitivity by employing a photonic crystal consisting of two kinds of photonic crystal slabs, each best suited for confining one of two possible polarizations: Alternating slabs of dielectric rods in air (rod layers, appropriate for confining TM-polarized waves) and air holes in dielectric (hole layers, appropriate for confining TE-polarized waves).

Wave-guiding structures can be designed within this crystal by introducing planar line defects in the hole and/or rod layers, resulting in the formation of defect (guided) bands inside the band gap. This results in planar arrays of defects, which are amenable to micro-fabrication, and is the method used here. A remarkable property of this 3D crystal is that the resulting guided modes are very similar to the 2D TE- and TM-polarized modes one gets from solving a 2D problem with the dielectric constant defined by the corresponding cross section along the defect plane. Hence, in the 3D crystal, a sequence of larger holes in a hole layer results in a TE-like mode pulled up from the dielectric band, predominantly polarized with its magnetic field normal to the defect plane. Similarly, a sequence of smaller rods in a rod layer also results in a TM-like mode pulled up from the dielectric band, but now predominantly polarized with its electric field normal to the defect plane.

Due to the omnidirectional gap provided by the photonic crystal, the above procedure enables the design of wavelength-scale minimal-loss waveguide networks for both polarizations. This is not enough though: each polarization satisfies a different dispersion relation, resulting in different propagation properties such as speed and pulse broadening, thus leading to a different response in any device. However, if one combines the two sequences of line defects in a way so that the two guided modes are close spatially yet maintain different symmetry, one can tailor the defect structures to enforce an "accidental degeneracy" in the guided dispersion relations, i.e. to have them coincide. In this regard, it is important to identify a symmetry operation along the guiding direction, with respect to which the two modes (eigenstates) transform oppositely, so that a tailored defect structure respecting this symmetry will not result in mode mixing and repulsion.

In the one case where this has been demonstrated, the waveguides where designed along a certain direction for which a vertical mirror plane exists. That resulted into doubly-degenerate polarization-independent straight waveguides. The important question asked is what happens when the symmetry along the guiding direction breaks, for example by the presence of a sharp bend. It was shown that the effect of the symmetry breaking was minimal, due to the presence of an additional "approximate" symmetry plane running horizontally through the waveguide planes. These designed modes are approximately even (TE) and odd (TM) under reflection on a plane parallel to the hole and rod layers. In a purely 2D system this symmetry is exact, prohibiting mode mixing even at lattice distortions such us bends or disorder. This is a key criterion needed to induce a significant suppression of mode mixing at similar planar lattice distortions.

This success is an indication of the great importance of this lateral symmetry. In fact, this is the only symmetry that is need. A photonic crystal can be designed to posses an exact lateral symmetry plane supporting two degenerate modes that transform as different irreducible representations of the corresponding symmetry operation, one for each polarization. When this is the case, any optical network designed symmetrically on this plane will not break the symmetry and thus will introduce absolutely zero polarization dependency, even at features such as sharp bends or lateral disorder. Our goal then of a 100% lossless polarization-insensitive integrated optical network can be achieved.

Figure 1A:
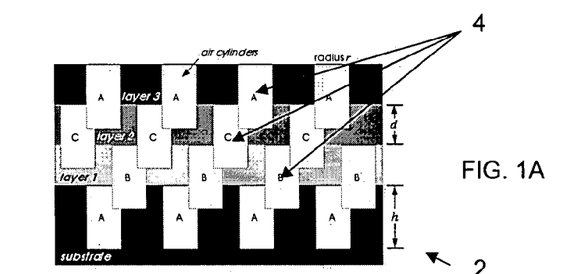
FIGS. 1A–1C are schematic diagrams illustrating a photonic crystal design in accordance with the invention.
Figure 1B:
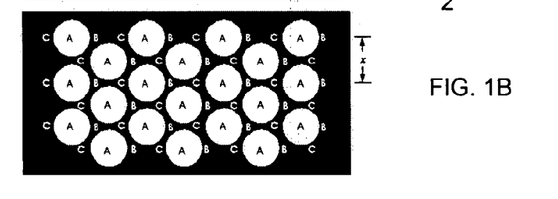
Figure 1C:
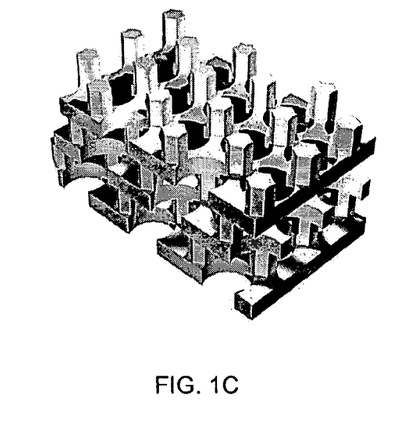

FIG. 1A shows the fundamental structure comprising a 3D photonic crystal structure 2 that is a fcc lattice (possibly distorted) of air or low-index cylinders 4 in dielectric, oriented along the 111 direction. This results in the layered structure, as shown in FIG. 1C, and depicted schematically in FIG. 1B in vertical and horizontal cross-sections. Typical parameters, for an undistorted fcc lattice of air cylinders having a dielectric constant of 12 (Si), are: d=a/sqrt(3), x=a/sqrt(2), r=0.293a, and h=0.93a, where a is the fcc lattice constant. This results in a 21% complete three-dimensional band gap, centered at a frequency of 0.569 c/a.

Figure 2:
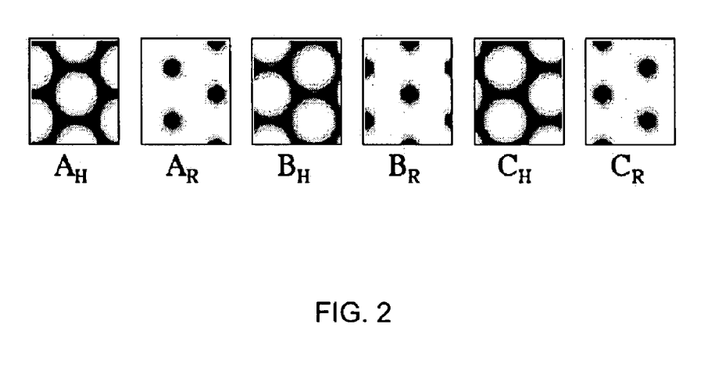
FIG. 2 is a schematic diagram illustrating a layer stacking structure in accordance with the invention.

The platform used by the invention is modified so that it possesses a horizontal mirror plane, as shown in FIG. 1A. This can be achieved by introducing a stacking fault followed by a reversed order of crystal layers. The periodic structure consists of a cylindrical hole stacking ABCABC . . . , as shown in FIGS. 1A and 1B, or in terms of individual hole and rod slabs $A_H A_R B_H B_R C_H C_R A_H A_R B_H B_R C_H C_R$ . . . , as shown in FIG. 2 that exhibits a photonic band gap 21% of its midgap frequency.

Two different mirror symmetric structures can be created. The first mirror symmetric structure includes a hole slab in the center with an exact horizontal mirror plane running through it. This is achieved by the following stacking . . . ABCACBA . . . which in terms of individual slabs is . . . $A_H A_R B_H B_R C_H C_R A_H C_R C_H B_R B_H A_R A_H$ . . . with a mirror symmetric hole slab $A_H$. This structure exhibits a photonic band gap 18.2% of its midgap frequency, which is not significantly lower than that of the periodic structure.

Figure 3:
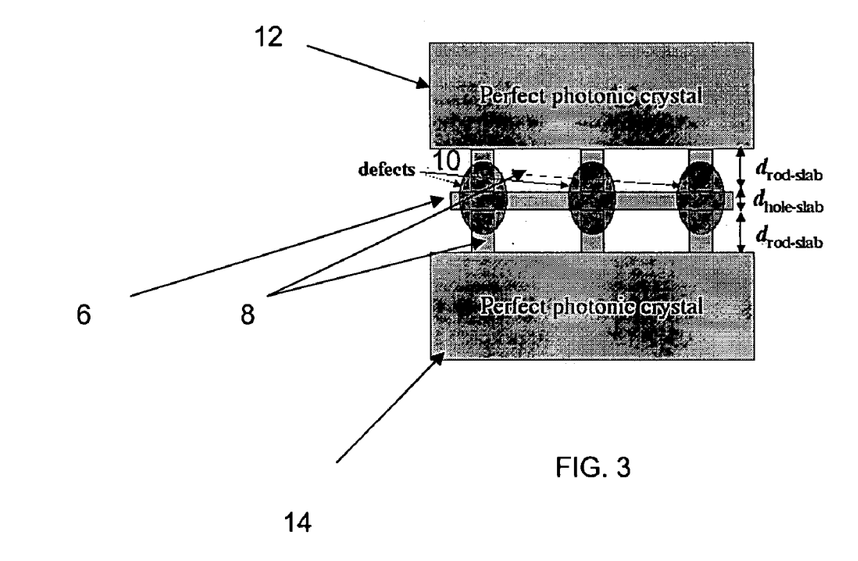
FIG. 3 is a schematic diagram illustrating a photonic crystal platform.

The second mirror structure includes a rod slab in the center with an exact horizontal mirror plane running through it, as shown in FIG. 3. This is achieved by the following stacking . . . ABCA(BA)CBA . . . where (BA) stands for a combination of a B layer followed by a partial back-refill of its top part and a subsequent A layer from the same height. In terms of individual slabs this creates . . . $A_H A_R B_H B_R C_H C_R A_H A_R A_H C_R C_H B_R B_H A_R A_H$ . . . with a mirror symmetric rod slab $A_R$. This structure exhibits a photonic band gap 18.4% of its midgap frequency, which is slightly better than the previous case, but the structure is significantly more complicated. The first mirror structure with the mirror symmetric hole slab is thus more promising.

Designing waveguides on the mirror symmetric hole slab 6 of structure involves placing linear defects 10 symmetrically across the mid-plane in the hole slab 6 and in both rod 8 slabs above and below, as shown in FIG. 3. The objective is to create two modes with one of them even (TE-like) under reflection on the mirror plane, while the other is odd (TM-like) under reflection from the mirror plane. Then it is a matter of fine tuning the defects 10 in order to enforce an accidental degeneracy between them. Since the fundamental symmetry is a horizontal mirror plane, these two modes will not mix under any lateral distortion that does not break the mirror plane symmetry. In other words, any waveguide network designed symmetrically on the mirror plane will have the two polarization modes completely decoupled.

One can think of the center mirror hole slab 6 and the two adjacent rod slabs 8 as the effective design region, sandwiched by two perfect photonic crystals 12, 14, as shown in FIG. 3. The thickness of these layers can be used as additional design parameters in order to achieve the creation of the to modes of opposite symmetry.

This is the basic idea of the invention. The invention uses a procedure for enforcing accidental degeneracy between the two polarizations for a system with a vertical mirror plane. This system also has, however, an approximate horizontal mirror plane symmetry. One can demonstrate that even if the horizontal symmetry is not exact, a significant suppression of polarization mixing at a bend is obtained, which shows the potential importance and impact a structure with an exact symmetry can have in future integrated optics.

Figure 4A:
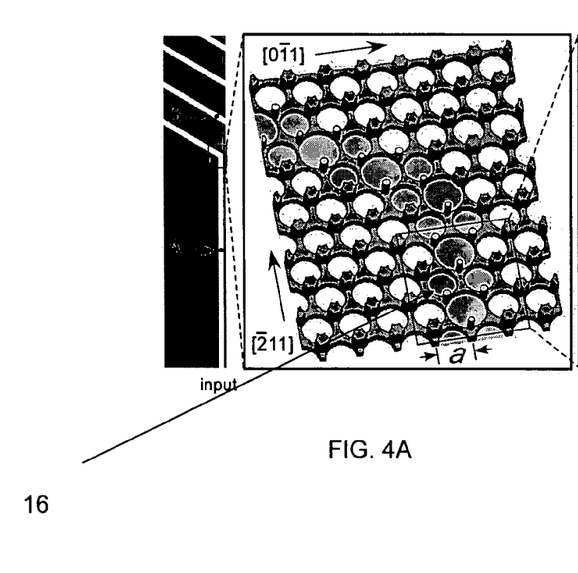
FIGS. 4A–4B are schematic diagram illustrating a bend area and a straight part of a waveguide.

A portion 16 of the invention structure consisting of two layers is shown in FIG. 4A. The waveguides are created along the set of $\{[\bar{2}11]\}$ (second nearest neighbor) directions, because there is a mirror plane perpendicular to the layers, lying along the axis of a straight $\{[\bar{2}11]\}$ waveguide, for both the hole- and rod-layer line defects. This distinguishes the TE-like and TM-like modes into different irreducible representations. In contrast, had one chosen a waveguide along the $\{[0\bar{1}1]\}$ (nearest neighbor) directions, the only symmetry operation that leaves both the hole- and rod-layer line defects invariant is a 180° rotation along $\{[0\bar{1}1]\}$. However, this operation cannot distinguish between TE-like and TM-like modes.

Figure 4B:
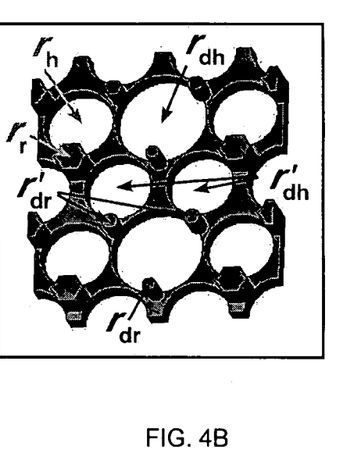

The detailed structure of the photonic crystal is shown in FIG. 4B. The hole radius within the hole layer is $r_h$=0.414a and the equivalent-rod radius within the rod layer is $r_r$=0.175a, where a is the in-plane lattice constant and is related to the fcc lattice constant $a_{fcc}$ by $a=a_{fcc}/\sqrt{2}$. The invention uses a dielectric contrast of 12, for which a band gap of 21% is obtained. The first step is to introduce two line-defects to create two guided modes of opposite polarization: larger holes ($r_{dh}$=0.53a) in the hole layer that will support the TE-like odd mode and smaller rods ($r_{df}$=0.08a) in the rod layer, which will support the TM-like even mode.

Figure 5A:
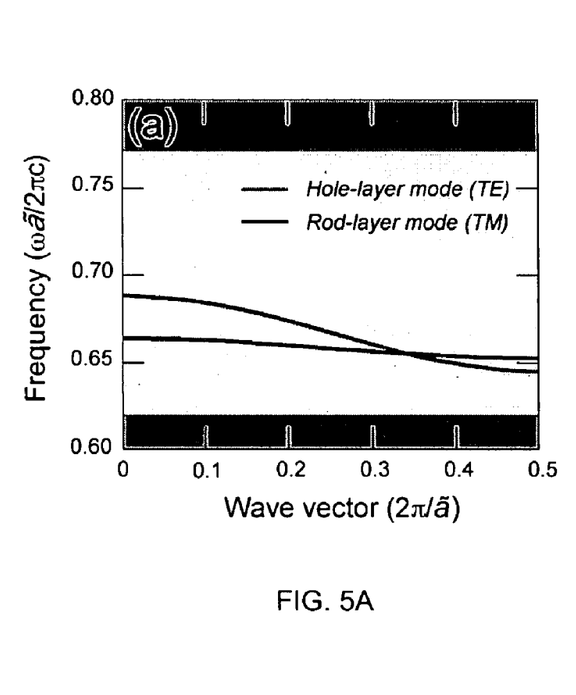
FIGS. 5A–5B are graphs illustrating the dispersion relation of the guided modes resulting from planar defect.

The dispersion relations of these two modes, calculated by the finite-difference time-domain (FDTD) method, are shown in FIG. 5A. They differ in both their center frequency and their bandwidth. A key property, however, is that they are both well described by a cosine dispersion relation, which makes them easier to match. The invention uses these two bands as a starting point and perturbs the surrounding crystal elements (i.e. other holes and rods in the vicinity) to force accidental degeneracy.

For simplicity, changes in radius only are considered. Such changes effectively add or remove dielectric material from the high field-intensity regions, thus introducing a shift in the corresponding dispersion relation. An empirical approach is adopted where the effect of different radius perturbations is fitted, and combines them through a conjugate-gradient search algorithm to find the combination producing the desired degeneracy.

Figure 5B:
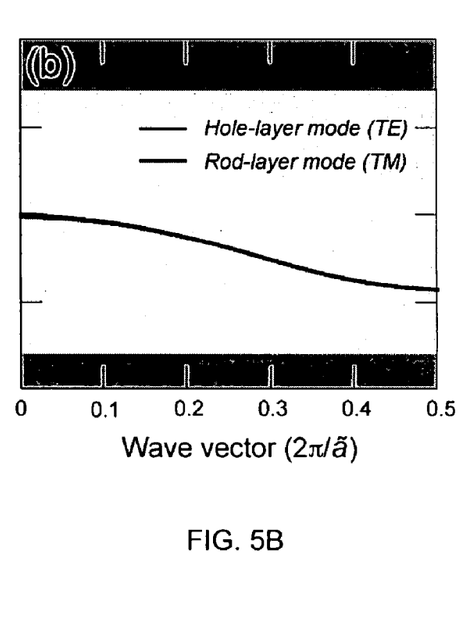

By combining two perturbations per layer one can find a range of defect parameters that result in degenerate bands, each at a different center frequency and bandwidth. A parameter set requiring small radius changes is $r_{dh}=0.55a$, $r'_{dh}=0.40a$, $r_{dr}=0.085a$, and $r'_{dr}=0.10a$ for the two hole and rod radii, respectively, as shown in FIG. 4B. The corresponding dispersion relations demonstrating the degeneracy are shown in FIG. 5B where additional bands are slightly pulled-up from the "dielectric" band as well, but are not shown here since they do not come close to our modes of interest. The resulting "doubly-degenerate" guided mode has a bandwidth of about 6% of its center-frequency and a group velocity at the Brillouin-zone center of about 0.13c. This is the first time a polarization-independent dispersion relation has been demonstrated for a linear waveguide in a 3D photonic crystal structure.

A natural and important question is to what degree this degeneracy maintains a polarization-independent response in cases where one break symmetry, such as at a sharp bend. To answer this, a system that involves a 60° bend is studied, as depicted in FIG. 4. Note that the two layers are not equivalent at the bend. While in the hole-layer structure has a smooth transition between the two straight waveguide-branches, in the rod-layer the bend creates a nearest neighbor coupling of two rods of radius $r_{dr}$ (normally second-nearest-neighbor coupling in the straight waveguide). In fact, there is no way to make both layers have a smooth transition between their two branches. This introduces slightly different high-transmission resonance conditions for each polarization. In addition, there will be some mixing between the two polarization states at the bend, where the mirror symmetry is destroyed.

The FDTD method is used to simulate the propagation of electromagnetic pulses through the bend. The computational system is taken very large to assure clear separation among the various pulses. It consists of a cell of size $72ã×16a×2a_v$, where ã is the lattice period along the propagation direction, $ã=\sqrt{3}a=\sqrt{3/2}a_{fcc}$, and $a_v$ is the lattice period along the vertical [111] direction (3 bilayers), $a_v=\sqrt{6}a=\sqrt{3}a_{fcc}$. The bend is located at a distance of 48ã from the entrance of the input waveguide. Perfectly-matched-layer (PML) boundary conditions are used in the propagation direction, and periodic boundary conditions in the other two directions. The waveguide region after the bend is "wrapped around" using the periodic boundary conditions, minimizing the required size of the computational cell.

Figure 6A:
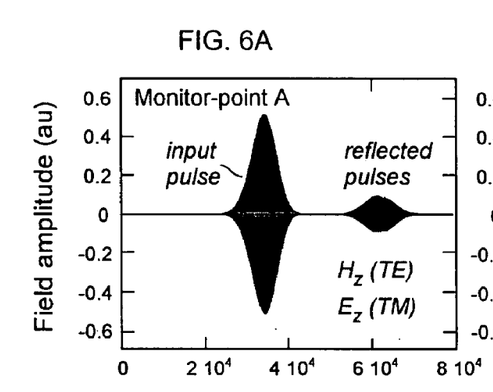
FIGS. 6A–6D are schematic plots illustrating fields at various observation points.
Figure 6B:
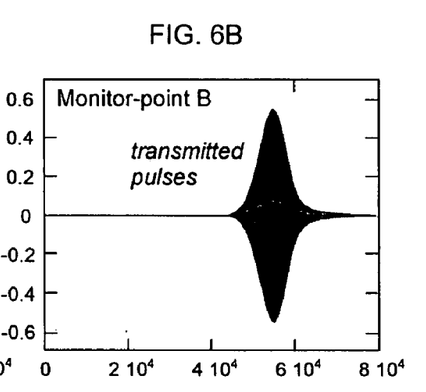
Figure 6C:
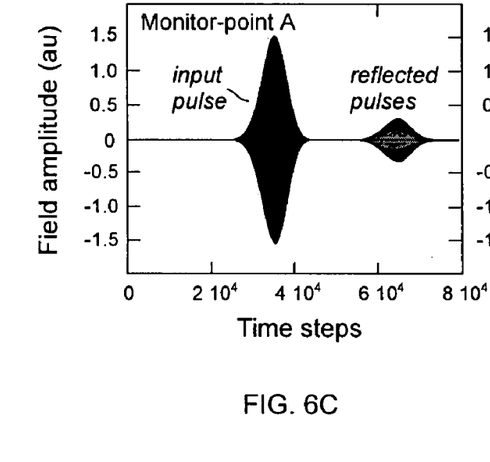
Figure 6D:
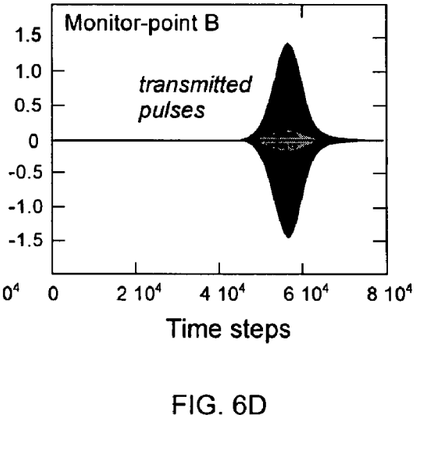

A pulse with a Gaussian profile in time is launched at the entrance of the waveguide, and the fields are monitored at two positions, as shown in FIGS. 6A–6D. Position A is located halfway between the source and the bend and is the observation point for the incident and reflected pulses, as shown in FIG. 6A, while position B is located 12ã after the bend and is the observation point for the transmitted pulse, as shown in FIG. 6B. Minimal secondary reflections at the edges of the computational cell are still present, but they appear at later times and do not contaminate the useful data. One finds that most of the energy is transmitted through the bend. As expected, the symmetry breaking at the bend results in transmitted and reflected pulses that are composed of both modes. However, this mixing is very small, comparable to half the overall reflection from the bend, as shown in FIGS. 6C and 6D.

Figure 7A:
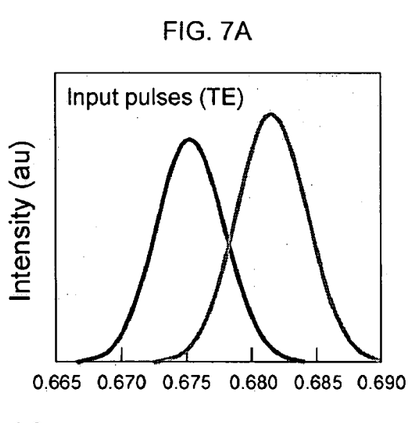
FIGS. 7A and 7B are plots illustrating the spectral profile of the input pulses used in the TE-like and the TM-like modes.
Figure 7B:
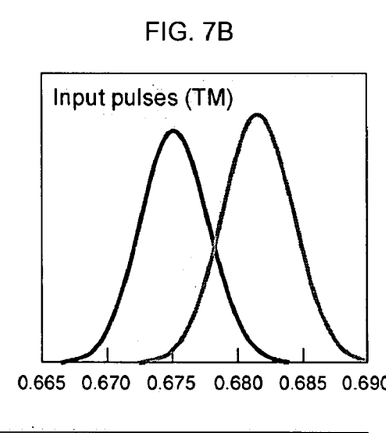
Figure 7C:
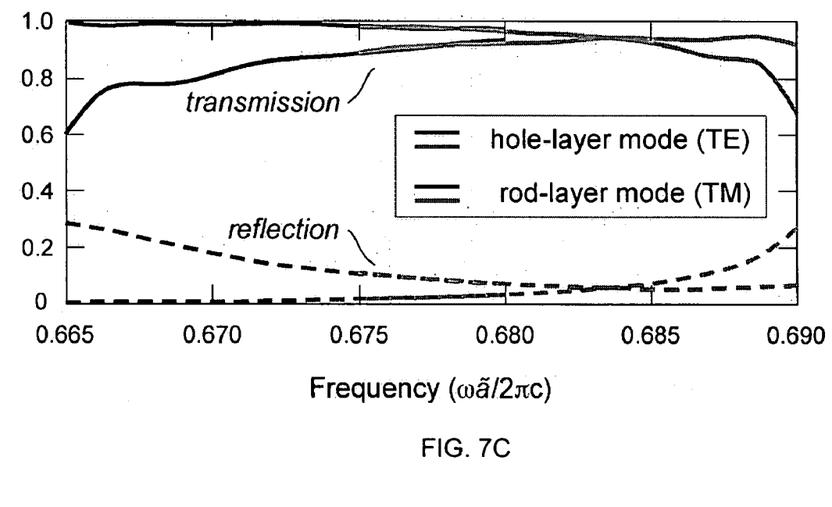
FIG. 7C is a plot illustrating corresponding transmission and reflection coefficients.

In order to quantify the transmission through the bend, the frequency-resolved pulses are studied going in and out of the bend. Since these are not single-mode waveguides, one must use data from flux-monitoring planes, positioned at A and B. For better resolution, as well as a consistency test, two pulses of different center frequencies per polarization are used, as shown in FIGS. 7A AND 7B. The corresponding ratios of the fluxes at A and B provide the transmission and reflection coefficients, as shown in FIG. 7C. These coefficients add up to 1 for all frequencies, with an error of less than 1%. A wide frequency range of high transmission are found for both modes, and a frequency $ωã/2πc=0.6835$ for which the transmissions coincide to 94.5%. Note that, as expected, resonant transmission is observed at different frequencies for the two modes: at lower frequencies for the TE-like mode and higher frequencies for the TM-like mode. Also note that the TM mode does not actually achieve 100% transmission at any frequency within the useful bandwidth. Further tuning of the bend region could lead to 100% transmission of this mode if desired.

Around the common transmission frequency, the calculated fluxes are resolved into the two modes, in order to quantify the degree of modal mixing. One finds that mixing is generally small, and that it monotonously decreases for increasing frequency (from about 5% at $ωã/2πc=0.675$ to less than 1% at $ωã/2πc=0.69$). At the common high-transmission frequency, the transmitted power retains its polarization to about 97%. The absence of strong modal mixing is due to the approximate horizontal mirror plane symmetry, as was mentioned earlier.

Figure 8A:
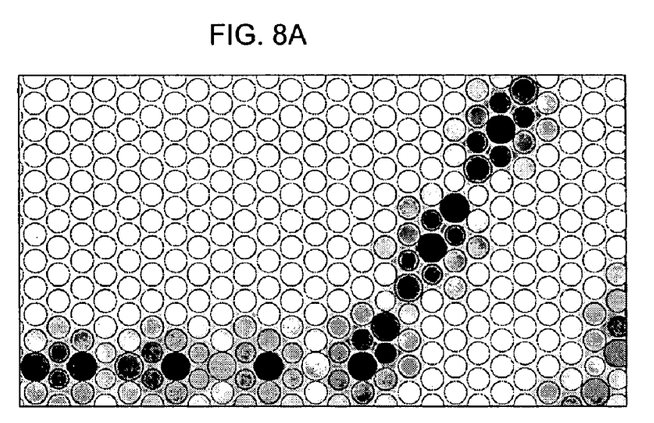
FIGS. 8A–8D are plots illustrating lateral and vertical mode profiles for a CW excitation.
Figure 8B:
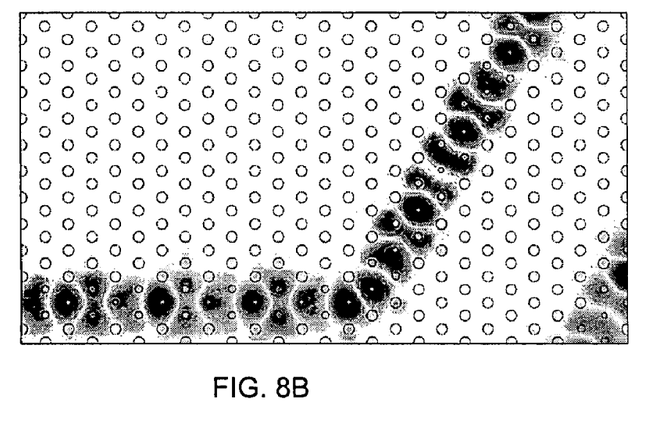
Figure 8C:
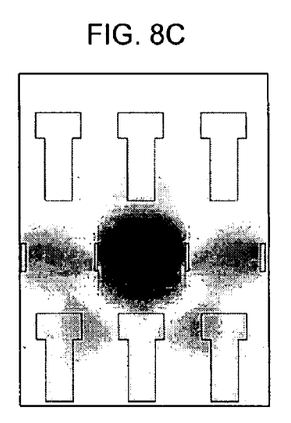
Figure 8D:
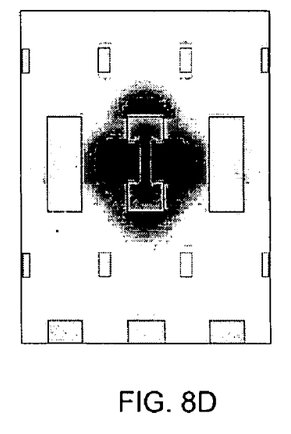

FIG. 8A is a plot of the TE-like field pattern of the propagating mode and FIG. 8B is a plot of the TM-like field pattern of the propagating mode, obtained by launching suitable continuous-wave (CW) signals. In the FIGS. 8C and 8D, the corresponding vertical cross-sections are shown, where the effects of the approximate symmetry become apparent. The TE-like and TM-like modes appear as two different representations of a single horizontal symmetry plane, thus resulting in minimal mode mixing in the bend region.

It as has been demonstrate that high (~95%) transmission through a sharp bend, with a high degree (~97%) of polarization insensitivity, for certain frequencies. Two improvements can be achieved by optimizing the crystal structure at the bend: i) an increase of the symmetry at the bend, so that less mode mixing occurs, and ii) a change of the resonant-transmission conditions for the two modes so that they better coincide. Thus, there are enough degrees of freedom for optimization that ultimately, it should be possible to achieve 100% polarization-independent transmission through sharp bends in this system.

In addition to guiding light around sharp corners, such fine-tuned waveguide structures are ideal for miniaturized passive polarization-processing components. Because each polarization is primarily guided in a different layer, it is very easy to separate the two modes. One can easily imagine designing devices such as polarization splitters (each mode bends into a different branch of a junction), or polarization rotators (one mode tunneling to the other by resonant mode mixing). These structures may thus prove to be very useful in future integrated all-optical systems. In contrast, had the alternative approach of designing a photonic crystal with line defects possessing the appropriate cross-sectional symmetry for polarization degeneracy been employed, such operations would be more difficult, as both modes would be primarily guided by the same crystal elements.

Although the present invention has been shown and described with respect to several preferred embodiments thereof, various changes, omissions and additions to the form and detail thereof, may be made therein, without departing from the spirit and scope of the invention.

What is claimed is:

1. A photonic crystal structure comprising a plurality of photonic crystal slabs that confine TE polarizations and TM polarizations, said photonic crystal slabs include alternating slabs of dielectric rods and air holes, said alternating slabs create a lateral symmetry plane in a guiding direction that completely decouples TM modes and TE modes regardless whether there are breaks in said lateral symmetry plane and further include an array of planar line defects resulting in the formation of defect bands inside the bandgap of said photonic crystal that allows said TM modes and TE modes to be decoupled in said lateral symmetry plane.

2. The photonic crystal structure of claim 1, wherein said holes guide said TE polarizations.

3. The photonic crystal structure of claim 1, wherein said rods guide said TM polarizations.

4. The photonic crystal structure of claim 1, wherein said holes are larger than said rods.

5. The photonic crystal of claim 1, wherein said slabs comprise an exact lateral symmetry plane supporting two degenerate modes.

6. The method of claim 1, wherein said holes are larger than said rods.

7. A method of forming a photonic crystal structure that minimizes polarization sensitivities comprising:
   forming a plurality of slabs having alternating slabs of dielectric rods and air holes, and
   forming an exact lateral symmetry plane in a guiding direction that completely decouples TM modes and TE modes regardless whether there are breaks in said lateral symmetry plane, and
   forming planar line defects resulting in the formation of defect bands inside the bandgap of said photonic crystal using said slabs of dielectric rods and air holes that allows said TM modes and TE modes to be decoupled in said lateral symmetry plane.

8. The method of claim 7, wherein said holes guide said TE polarizations.

9. The method of claim 7, wherein said rods guide said TM polarizations.

10. The method of claim 7, wherein said slabs comprises an exact lateral symmetry plane supporting two degenerate modes.

* * * * *